United States Patent
Chapuis et al.

(10) Patent No.: US 8,503,199 B1
(45) Date of Patent: Aug. 6, 2013

(54) AC/DC POWER CONVERTER WITH ACTIVE RECTIFICATION AND INPUT CURRENT SHAPING

(75) Inventors: Alain Chapuis, Riedikon (CH); Nicola Cinagrossi, Uster (IT)

(73) Assignee: Power-One, Inc., Camarillo, CA (US)

( * ) Notice: Subject to any disclaimer, the term of this patent is extended or adjusted under 35 U.S.C. 154(b) by 446 days.

(21) Appl. No.: 12/707,775

(22) Filed: Feb. 18, 2010

Related U.S. Application Data

(60) Provisional application No. 61/299,388, filed on Jan. 29, 2010.

(51) Int. Cl.
*H02M 5/45* (2006.01)
*H02M 3/335* (2006.01)

(52) U.S. Cl.
USPC .......................................... 363/37; 363/21.06

(58) Field of Classification Search
USPC ............. 363/34–38, 21.4, 21.06, 21.1, 21.11, 363/21.12, 21.14, 21.18, 84, 89, 90, 123, 363/125, 127; 323/266
See application file for complete search history.

(56) References Cited

U.S. PATENT DOCUMENTS

| | | | | |
|---|---|---|---|---|
| 5,291,383 | A | * | 3/1994 | Oughton ........................ 363/17 |
| 5,371,440 | A | * | 12/1994 | Liu et al. .................. 315/209 R |
| 5,940,280 | A | * | 8/1999 | Murai et al. ..................... 363/17 |
| 6,115,267 | A | * | 9/2000 | Herbert ........................... 363/25 |
| 6,184,630 | B1 | * | 2/2001 | Qian et al. .................... 315/224 |
| 6,188,183 | B1 | * | 2/2001 | Greenwood et al. .......... 315/307 |
| 6,437,994 | B1 | * | 8/2002 | Blom et al. ..................... 363/16 |
| 7,355,868 | B2 | | 4/2008 | Soldano |
| 2006/0013024 | A1 | * | 1/2006 | Temesi et al. ................... 363/44 |
| 2008/0247194 | A1 | * | 10/2008 | Ying et al. ....................... 363/17 |
| 2009/0201700 | A1 | * | 8/2009 | Aso et al. ........................ 363/17 |
| 2009/0302814 | A1 | | 12/2009 | Kapels et al. |
| 2010/0246220 | A1 | * | 9/2010 | Irving et al. .................... 363/78 |
| 2011/0069513 | A1 | * | 3/2011 | Lee et al. ........................ 363/16 |

FOREIGN PATENT DOCUMENTS

| | | |
|---|---|---|
| GB | 2452318 | 4/2009 |
| WO | 2009028954 | 3/2009 |

OTHER PUBLICATIONS

Ernö, Temesi & Frisch, Michael (Sep. 2004) "2nd Generation of PFC Solutions," Tyco Electronics/Power Systems, Vincotech.

(Continued)

*Primary Examiner* — Adolf Berhane
*Assistant Examiner* — Jeffrey Gblende
(74) *Attorney, Agent, or Firm* — Waddey & Patterson, P.C.; Mark J. Patterson; Gary L. Montle

(57) ABSTRACT

An AC/DC power converter has an AC input and a DC output, with an input rectifier circuit coupled to the AC input. The input rectifier circuit includes a passive half-bridge rectifier circuit functional to provide passive rectification of an AC input power sign and at least one current shaper circuit. The current shaper circuit includes an input inductor coupled between the AC input and a switch node in the input active rectifier circuit. The input current shaper circuit is functional to shape an AC input current signal associated with an AC input power signal to a substantially sinusoidal current signal. A bulk capacitor circuit is coupled to the input active rectifier circuit. A DC/AC converter circuit is coupled to the bulk capacitor circuit. A resonant circuit is coupled to the DC/AC converter circuit and an output rectifier circuit may be coupled between the resonant circuit and the DC output.

24 Claims, 5 Drawing Sheets

OTHER PUBLICATIONS

Itoh, R. and Ishizaka, K., "Single-phase sinusoidal convertor using MOSFETS," IEE Proceedings, vol. 136, Pt. B, No. 5, Sep. 1989.

Hancock, Jon Mark, "Bridgeless PFC Boosts Low-Line Efficiency," Power Electronics Technology, Feb. 2008.

Jovanović, Milan M., "State-of-the-Art, Single-Phase, Active Power-Factor-Correction Techniques for High-Power Applications—An Overview", IEEE Transactions on Industrial Electronics, vol. 52, No. 3, Jun. 2005.

Salmon, John C., "Techniques for Minimizing the Input Current Distortion of Current-Controlled Single-Phase Boost Rectifiers", IEEE Transactions on Power Electronics, vol. 8, No. 4, Oct. 1993.

* cited by examiner

AC/DC POWER CONVERTER WITH ACTIVE RECTIFICATION AND INPUT CURRENT SHAPING

CROSS-REFERENCES TO RELATED APPLICATIONS

This application claims benefit of U.S. Provisional Patent Application No. 61/299,388, filed Jan. 29, 2010, the content of which is fully incorporated herein by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to switch mode AC/DC power supplies. More particularly, the present invention pertains to switch mode AC/DC power converters that employ a front-end power factor correction circuit and active rectification devices to improve the efficiency of the converter.

Designers of AC/DC power supplies are constantly striving to improve the efficiency of their designs. At the same time, careful attention must be paid to the cost, component count, and physical size of the design.

Conventional AC/DC switch mode power supplies typically include multiple stages, modules, or sections of circuit elements that perform different functions in a process of efficiently converting power from an AC supply to a DC output. For example, a critical functional block in high efficiency AC/DC power conversion is a power factor correction (PFC) circuit to improve the quality of power drawn from the power grid to which a powered device is connected.

FIG. 1 shows the functional blocks arranged in a typical prior art AC/DC switch mode power supply 10. First, an input filter stage 11 filters unwanted high frequency noise originating from the high frequency switching within the AC power supply and protects the power supply from transients which may occur on the AC power source. An input passive rectification stage 12 uses a diode bridge rectifier to rectify the filtered AC input voltage. A power factor correction (PFC) stage 13 may include an active circuit that shapes the input current from the AC power source to a near sinusoidal shape. A protection device 14 bridges the PFC stage to protect the power supply from input voltage surges. A bulk capacitor 15 acts as a waveform smoothing and energy storage element to provide a near DC voltage to subsequent conversion stages. A DC/AC converter block 16 is conventionally a controlled switching circuit that converts the bulk DC voltage to a high frequency AC signal. The AC signal is coupled to the primary side of a transformer 17 that transforms the high frequency AC current/voltage as needed and provides galvanic isolation. The secondary side of the transformer 17 is then coupled to an output passive rectifier stage 18 that rectifies the high frequency AC signal to a DC voltage. Finally, an output filter stage 19 filters any residual AC components to provide a clean DC output to a DC load terminal.

Conventional AC/DC power supplies using multiple conversion stages as shown in FIG. 1 have relatively poor efficiency. For example, passive rectification of the AC input generates losses because of voltage drops in the multiple passive rectification components, e.g., diodes. These same losses occur in the output passive rectification stage.

Many AC/DC switch mode power supplies employ MOSFET switches in an active rectification circuit. MOSFET devices have an intrinsic (body drain) diode that is known to generate high reverse recovery losses when the diode changes from a conductive to a non-conductive state. Preferably, a high efficiency AC/DC power converter will minimize or avoid such losses.

What is needed is a switch mode power supply that is more energy efficient by eliminating circuit components and discrete conversion states that create unwanted losses.

BRIEF SUMMARY OF THE INVENTION

The AC/DC power converter of the present invention uses active circuit components in different conversion stages and merges conversion steps or functions to improve the efficiency of the overall AC/DC power supply. On the input side of the converter, the passive rectification and PFC stages and circuits used in prior art designs are replaced with an active input rectifier circuit that uses a current shaping circuit to reduce losses and therefore improve efficiency by maintaining the quality of drawn power.

On the output side of the converter, an output active rectification circuit replaces the passive rectification used in conventional prior art power converters. This also improves efficiency. Furthermore the transformer used in conventional designs is replaced in the present invention by a passive resonant circuit to reduce switching losses in the DC/DC conversion stage.

The input rectifier circuit in one embodiment advantageously combines active rectification with input current shaping. In some embodiments, the input rectifier circuit combines a passive half-bridge rectifier circuit with an active half-bridge rectifier circuit. The active bridge rectifier circuit, including first and second switch elements, is coupled via an inductor to one of the AC input lines. The passive half-bridge rectifier circuit, including a pair of rectifier diodes, is coupled to the other AC input line. The passive rectifier diodes will each conduct current during a half cycle of the AC line period. The rectifier switches are controlled in such way that the average current through the inductor follows a substantially sinusoidal waveform by tracking the AC source voltage waveform.

In some embodiments, the AC/DC converter can include protection diodes at the input to provide a lower impedance path in parallel with the rectifier switches. This protects the AC input should surge voltages be applied.

Therefore, in accordance with one embodiment of the invention, an AC/DC power converter has an AC input and a DC output, an input rectifier circuit coupled to the AC input, the input rectifier circuit including a first half-bridge rectifier circuit and at least one input current shaper circuit. The first half-bridge rectifier circuit that is functional to provide passive rectification of an AC input power signal. The current shaper circuit includes an input active rectifier circuit and an input inductor coupled between the AC input and a switch node in the input active rectifier circuit. The input current shaper circuit is functional to shape an AC input current signal associated with an AC input power signal to a substantially sinusoidal current signal. A bulk capacitor circuit is coupled to the input active rectifier circuit. A DC/AC converter circuit is coupled to the bulk capacitor circuit. A resonant circuit is coupled to the DC/AC converter circuit and an output rectifier circuit may be coupled between the resonant circuit and the DC output.

In one embodiment, the input active rectifier circuit may include a first switch element coupled to a second switch element at the switch node. Each of the first and second switch elements includes a pair of first and second MOSFET switches. Each of the first and second MOSFET switches has an intrinsic diode and a source terminal with the source terminals connected in common. A fast recovery diode is coupled in parallel with the pair of first and second MOSFET switches so that the intrinsic diodes are electrically coupled inversely to the fast recovery diode.

In another embodiment, the resonant circuit includes a series inductor having a first end coupled to the DC/AC converter and a second end coupled to an inductor node. A parallel inductor has a first end coupled to the series inductor at the inductor node. A resonant capacitor circuit is coupled to the second end of the parallel inductor. The resonant circuit can further include a transformer having a primary side coupled across the parallel inductor and a secondary side coupled to the output active rectifier circuit.

In some embodiments of the invention, the secondary side of the transformer is a secondary winding having first and second ends. The output rectifier circuit can have output rectifier switches circuit coupled to the first and second ends of the secondary winding. The secondary winding of the transformer may be center-tapped in some embodiments, with the output rectifier switch circuit having a first output rectifier switch coupled to the first end of the secondary winding and a second output rectifier switch coupled to the second end of the secondary winding.

BRIEF DESCRIPTION OF THE SEVERAL
VIEWS OF THE DRAWINGS

DETAILED DESCRIPTION OF THE INVENTION

Figure 1:
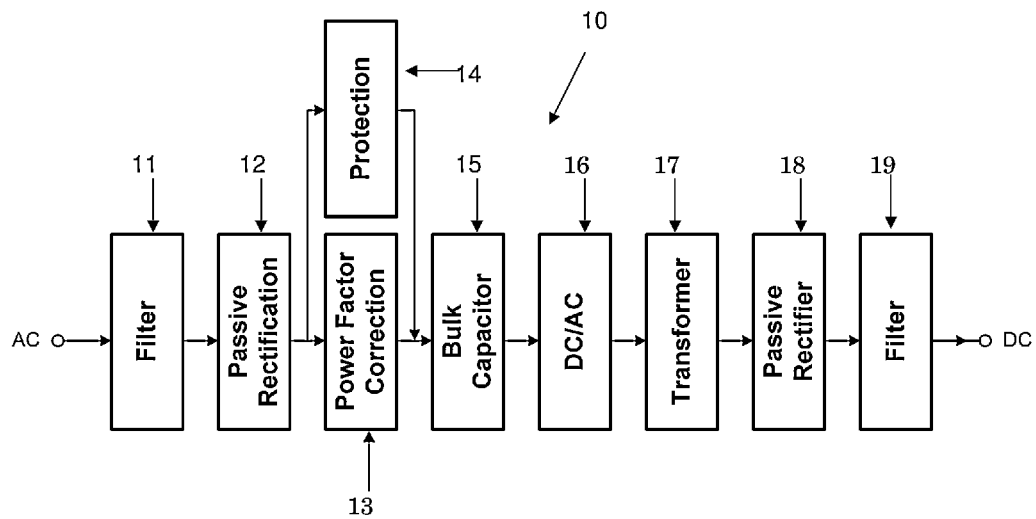
FIG. 1 is a block diagram of a conventional AC/DC switch mode power supply.
Figure 2:
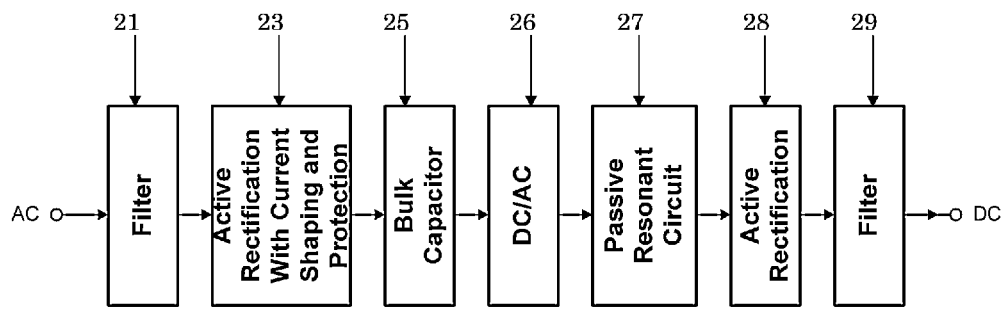
FIG. 2 is a block diagram of one embodiment of an AC/DC power converter in accordance with the present invention.

A block diagram of one embodiment of an AC/DC power converter 20 in accordance with the present invention is illustrated in FIG. 2. In this embodiment, the AC input is coupled to an input active rectifier circuit 22 through an input filter circuit 21. The input filter circuit 21 provides a filtered AC input signal to an input rectifier circuit 23. In one embodiment, the input rectifier circuit 23 can combine active and passive circuitry for providing input voltage protection, passive rectification, active rectification, and input current shaping.

The input rectifier circuit 23 provides a rectified bulk DC voltage to a bulk capacitor circuit 25. The bulk DC voltage is coupled across an active DC/AC circuit (switched inverter) 26, which converts the bulk DC voltage to a high frequency AC signal. The high frequency AC signal is coupled to an active output rectifier circuit 28 through a resonant circuit 27. The output rectifier circuit 28 provides a rectified DC output voltage to an output filter circuit 29. The output filter circuit 29 then provides a filtered DC output voltage to the DC output, for use by a load device.

The input filter circuit 21 and output filter circuit 29 conventionally use passive and/or active components to filter random noise and unwanted frequency signals from the AC input and DC output and may also inhibit transmission of unwanted high frequency signals from the converter 20 to the AC line. In some applications, one or both of the filter circuits 21, 29 may not be necessary.

Figure 3:
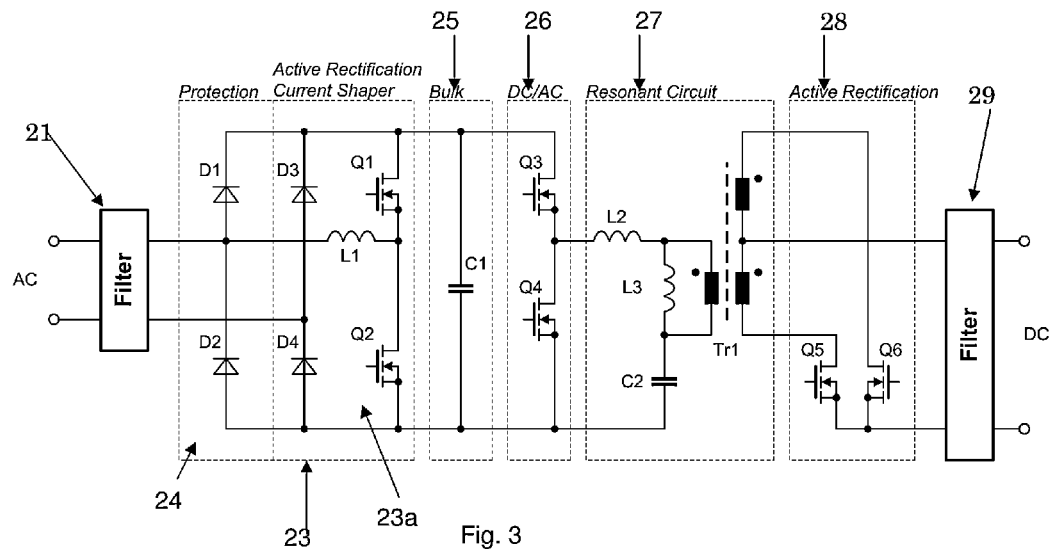
FIG. 3 is a schematic diagram of one embodiment of an AC/DC power converter in accordance with the block diagram embodiment of FIG. 2.

One embodiment of the AC/DC converter of FIG. 2 is shown in more detail in FIG. 3. In this embodiment, first and second AC input terminals are coupled to the input rectifier circuit 23 through the input filter circuit 21. The input rectifier circuit 23 may combine a protection circuit 24 and a current shaper circuit 23a.

The protection circuit 24 includes protection diodes D1 and D2, with the anode of protection diode D1 and cathode of diode D2 each coupled to the first AC input terminal through the filter circuit 21.

The current shaper circuit 23a may include, or be coupled to, diodes D3 and D4 arranged as a passive half-bridge rectifier circuit coupled from a common node to the second AC input terminal. First and second switch elements Q1 and Q2 are arranged as an active half-bridge rectifier circuit and are coupled at a common switch node to one end of an input inductor L1. The other end of inductor L1 is coupled to the first AC input terminal. In one embodiment, the switch elements Q1 and Q2 can be MOSFET switches with their respective gate electrodes coupled to a control circuit (not shown) to control switching operation of the active rectifier. The control circuit may include control logic for operating the various switches, as described below.

The input rectifier circuit 23 provides a rectified bulk DC voltage across bulk capacitor circuit 25. In this embodiment, the bulk capacitor circuit can be a single electrolytic capacitor C1. In other embodiments, other types and combinations of one or more bulk capacitors can be used.

The bulk DC voltage from bulk capacitor circuit 25 is coupled across DC/AC converter circuit 26. In this embodiment, the DC/AC converter circuit 26 can include first and second MOSFET switches Q3 and Q4 arranged in a half-bridge inverter configuration, with their respective gate electrodes coupled to a control circuit (not shown) to control switching operation to convert the bulk DC voltage to a high frequency AC signal.

The switches Q3 and Q4 are coupled from a common switch node to resonant circuit 27. In this embodiment, the resonant circuit 27 includes a series inductor L2 having a first end coupled to the common switch node in the DC/AC converter circuit 27 and a second end coupled to the first end of a parallel inductor L3 at an inductor node. The second end of parallel inductor L3 is coupled to a resonant capacitor circuit. In this embodiment, the resonant capacitor circuit can be a single resonant capacitor C2. The resonant circuit 27 further includes a transformer Tr1 having a primary side or primary winding connected across the parallel inductor L3 from the inductor node to the resonant capacitor C2. The secondary side or secondary winding of the transformer Tr1 can be coupled to the output rectifier circuit 28.

The output rectifier circuit 28 can be an active rectifier circuit with an output rectifier switch circuit coupled to first and second ends of the secondary winding. In the embodiment of FIG. 3, the secondary winding of the transformer Tr1 can be center-tapped. The output rectifier switch circuit can include a first output rectifier switch or MOSFET switch Q6 coupled to the first end of the secondary winding and a second output rectifier switch or MOSFET switch Q5 coupled to the second end of the secondary winding. The gate electrodes of MOSFET switches Q5 and Q6 are coupled to a control circuit (not shown) that controls switching operation of the MOSFET switches Q5 and Q6 so that the output rectifier circuit 28 provides an unfiltered DC output voltage to output filter circuit 29. In the embodiment of FIG. 3, the center-tapped node on the secondary winding of transformer Tr1 is coupled to a first DC output terminal through the output filter circuit 29. The MOSFET switches Q5 and Q6 are coupled to a common source node which is also coupled to a second DC output terminal through the output filter circuit 29.

Figure 4:
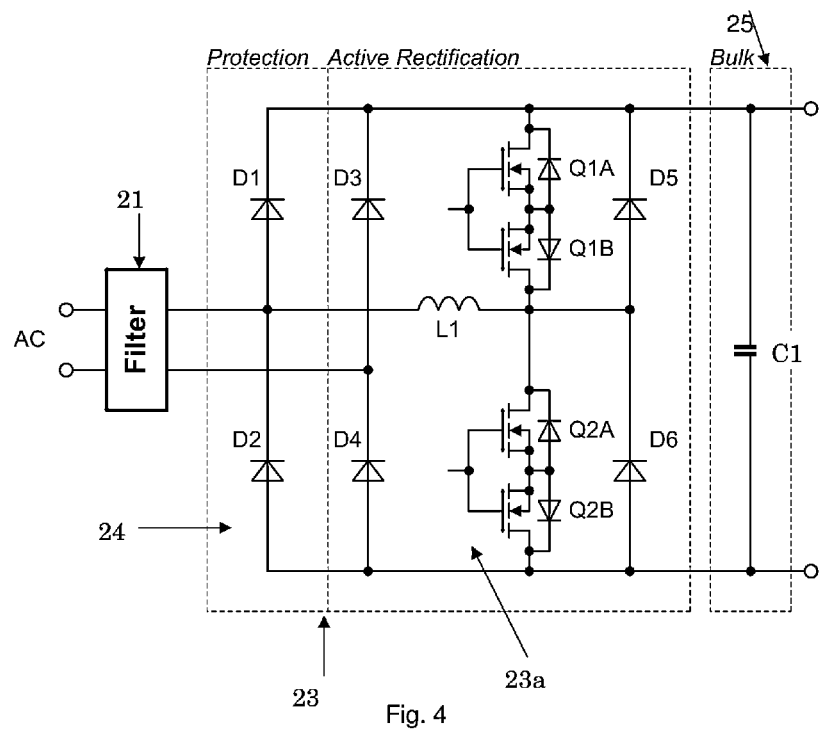
FIG. 4 is a schematic diagram of another embodiment of the input rectifier circuit of the present invention.

Those skilled in the art will recognize that MOSFET devices may include an intrinsic diode (also known as the body drain diode) that must be accounted for in actual circuit operation. In relation to the efficiency of switch mode AC/DC power converters, it is known that the intrinsic diode generates high reverse recovery losses when the diode changes from a conductive to a non-conductive state. An alternative embodiment of input rectifier circuit 23 as used in the present invention is shown in FIG. 4. This embodiment minimizes or eliminates excessive switching losses due to recovery charges in the body drain diode of the MOSFET switches.

In the embodiment of FIG. 4, the first and second switch elements in the current shaper circuit 23a can be respective bidirectional switch pairs Q1A/Q1B and Q2A/A2B. More particularly, in this embodiment the first switch element has a first MOSFET switch Q1A arranged back-to-back (common source) with a second MOSFET switch Q1B. The first switch element further includes a first fast recovery diode D5, such as a silicon carbide diode, connected in parallel with the first and second MOSFET switches Q1A and Q1B.

The second switch element in the input rectifier circuit 23 is identically configured, with a second fast recovery diode D6 connected in parallel across MOSFET switches Q2A and Q2B. The anode of first fast recover diode D5 is coupled to the cathode of second fast recovery diode D6 at a common switch node which is also coupled to the second end of input inductor L1.

In the embodiment of FIG. 4, the body drain diodes are shown connected across the drain and source of each switch Q1A, Q1B, Q2A, and Q2B. Also, the MOSFET switch pairs Q1A/Q1B and Q2A/Q2B devices are connected back to back (common source) so that there is no conductive path through the body drain diodes of the devices when both switches Q1A/Q1B or Q2A/Q2B are in their off state. With this approach, rather than have the current commute into the low performance body drain diode of the MOSFET switches, the current goes through the fast recovery diode.

Also in the embodiment of FIG. 4, the gate electrodes for each switch pair are connected together. In other embodiments, the gate electrodes may be connected to, and driven separately by, a control circuit.

In the embodiment of FIG. 4, it is not necessary that each MOSFET switch in the switch pair have the same or full breakdown voltage to sustain the bulk voltage. For example, one MOSFET switch in each pair could be a low voltage device, e.g. a 50V breakdown voltage device for MOSFET switches Q1B and Q2B. The other MOSFET switch in each pair could then be a high voltage device, e.g. a 600V breakdown voltage device for MOSFET switches Q1A and Q2A).

Again referring to FIG. 4, if MOSFET switches having the same breakdown voltage are used in a switch pair, the control or driver circuit (not shown) should be configured to turn the MOSFET switches (e.g., Q1A/Q1B) on and off substantially simultaneously. If the MOSFET switches in a switch pair have different break down voltages for the switches, it may be advantageous (but not necessary) to first turn-off the MOSFET switch in the switch pair having the higher breakdown voltage. This may be accomplished by selecting MOSFET devices having different threshold voltages or by adding a delay in the gate drive signal from the control circuit to slightly slow down or delay turn-off of the MOSFET switch in the switch pair having the lower breakdown voltage.

Referring to operation of the AC/DC converter embodiment of FIG. 3, the process of DC/DC conversion from the DC/AC converter circuit 26 begins with the switches Q3 and Q4 being switched by the control circuit at a substantially 50% duty cycle. A dead period can be provided between the on states of the high side switch (Q3) and low side switch (Q4), and vice versa. This allows the bridge voltage from the DC/AC converter circuit 26 to swing from one end to the other, thereby providing zero voltage switching. The bridge voltage from the AC/DC converter circuit 26 is supplied to the resonant circuit 27 to transfer energy from the primary side to the secondary side of transformer Tr1 with the lowest losses.

In one embodiment as shown in FIG. 3, the resonant circuit 27 includes at least two inductive components or elements L2 and L3 and at least one resonant capacitor C2. The inductances can be discrete components or may be integrated into and realized from the transformer Tr1. For example, the parallel inductor L3 may be realized by the magnetizing inductance of the transformer Tr1. The series inductor L2 may be realized as the leakage inductance between the primary and secondary windings of the transformer Tr1. The series inductor L2 shapes the current transferred to the secondary side of the transformer Tr1 to substantially a sinusoidal waveform (see $I_{L2}$ waveform on FIG. 5) while achieving zero current switching in the output rectifier circuit 28.

Figure 5:
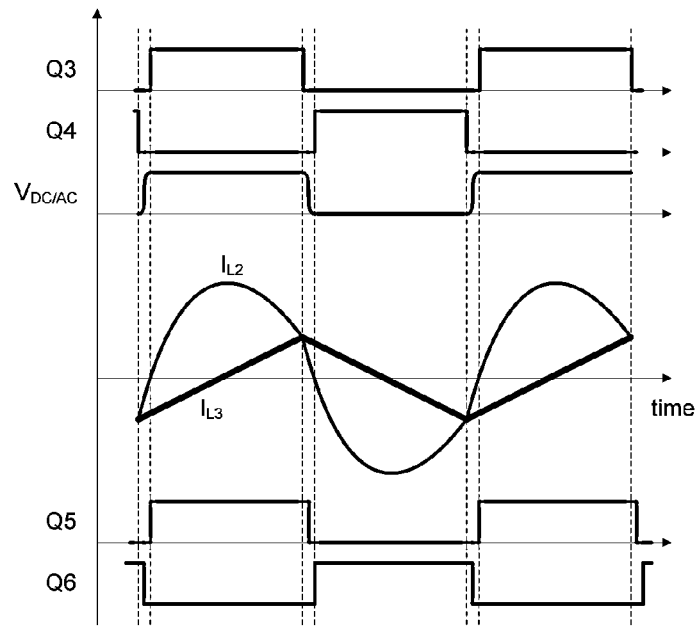
FIG. 5 is a graphical representation of voltage and current waveforms in the resonant circuit of the embodiments of the present invention shown in FIGS. 2 and 3.

As shown in FIG. 5, the current $I_{L3}$ in the parallel inductor L3 increases and decreases in a substantially linear manner as a function of the DC output voltage from the DC/AC converter 26 that is reflected back to the primary side of transformer Tr1. The energy stored in the inductor L3 will force the bridge voltage to swing down when switch Q3 is turned off and to swing up when switch Q4 is turned off.

Figure 6:
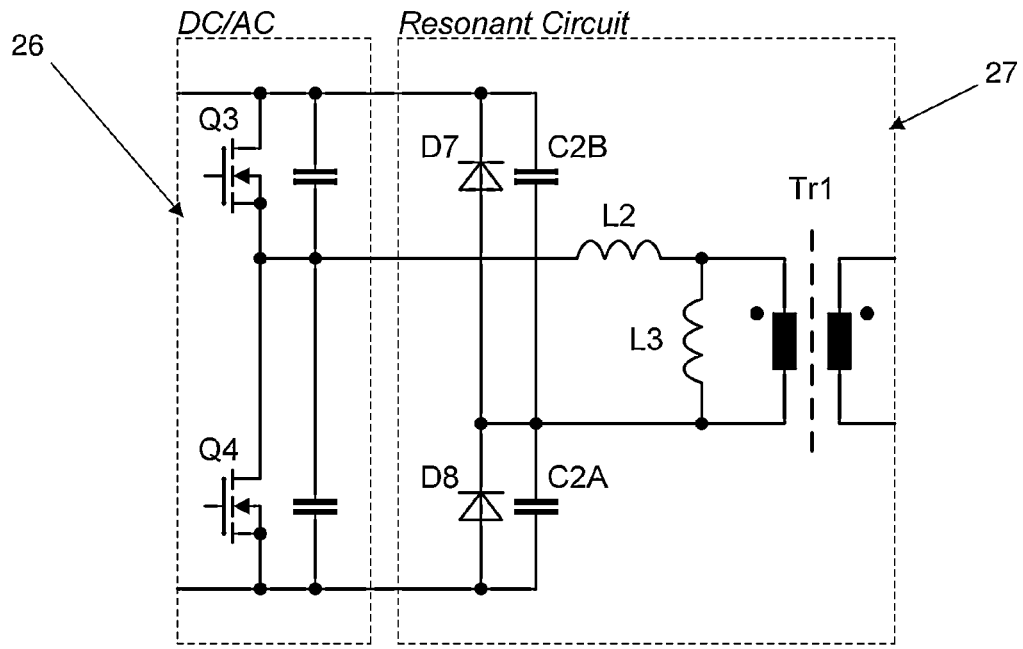
FIG. 6 is a schematic diagram of an alternative embodiment of the resonant circuit used in the embodiment of the present invention shown in FIG. 2.

FIG. 6 shows an alternative embodiment of the DC/AC circuit 26 and the resonant circuit 27. In this embodiment, the resonant capacitor circuit includes first and second resonant capacitors C2A and C2B coupled across the bulk capacitor circuit 25. The first resonant capacitor C2A and second resonant capacitor C2B may have substantially equal capacitances and may be series connected together at the second end of the parallel inductor L3. In addition, clamp diodes D8 and D7 can be connected in parallel across respective resonant capacitors C2A and C2B to limit the voltage applied across the capacitors. This results in an embedded power/current limitation on the output of the converter because the voltage amplitude across the resonant capacitor(s) C2A and C2B is limited. Additional capacitors (not shown) can be connected in parallel to switches Q3 and Q4 to equalize or align the energy stored in inductor L3 with the energy stored in the total capacitance on the DC/AC converter switch node, which energy needs to be charged and discharged during the transition periods, as mentioned above.

In the embodiment of FIG. 3, the secondary side of the transformer Tr1 can have a center tapped secondary output winding as shown. The ends of the secondary winding are connected to respective output rectifier switches Q5 and Q6 which together function as an active synchronous rectifier. The center tap on the secondary winding is connected directly to the first or positive output DC output terminal. The gate of switch Q5 (Q6) is switched on by a control circuit (not shown) when the voltage across the rectifier switch Q5 (Q6) has substantially reached 0V and is turned off when the current through the switch Q5 (Q6) is again substantially 0 A. FIG. 5 further shows the switch timing for the operation of switches Q3 and Q4 in relation to the switching of output rectifier switches Q5 and Q6.

Figure 7:
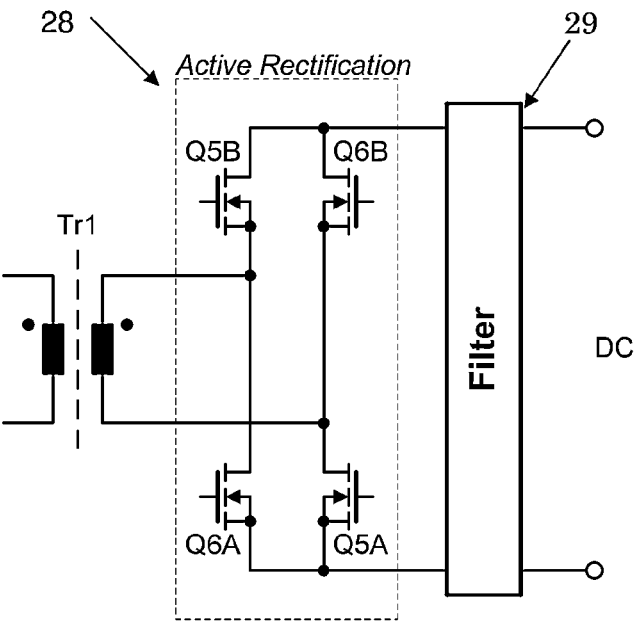
FIG. 7 is a schematic diagram of an alternative embodiment of the output rectifier circuit shown in the embodiment of the present invention shown in FIG. 2.

FIG. 7 illustrates an alternative embodiment of the output rectifier circuit 28 in which synchronous rectification is implemented using a single secondary winding in the transformer Tr1 and four MOSFET switches Q5A, Q5A, Q6A, and Q6B arranged as a full bridge active rectifier. Typically switches Q6A/Q6B and Q5A/Q5B may be controlled by the same timing signal from a control circuit (not shown). In one embodiment, the operation of switches Q6A/Q6B and Q5A/Q5B can proceed substantially as shown in the timing diagram of FIG. 5.

Figure 9:
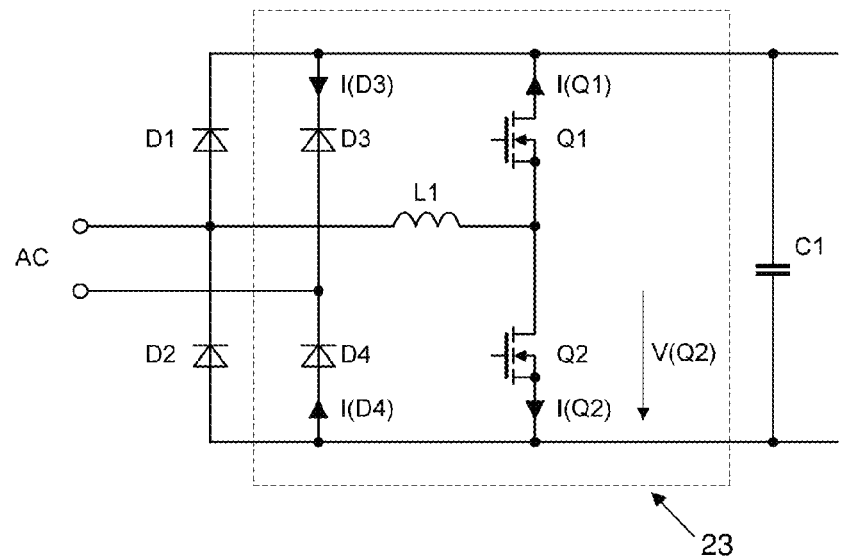
FIG. 9 is a schematic of an input rectifier circuit in accordance with the present invention, further indicating voltage and current parameters.
Figure 10:
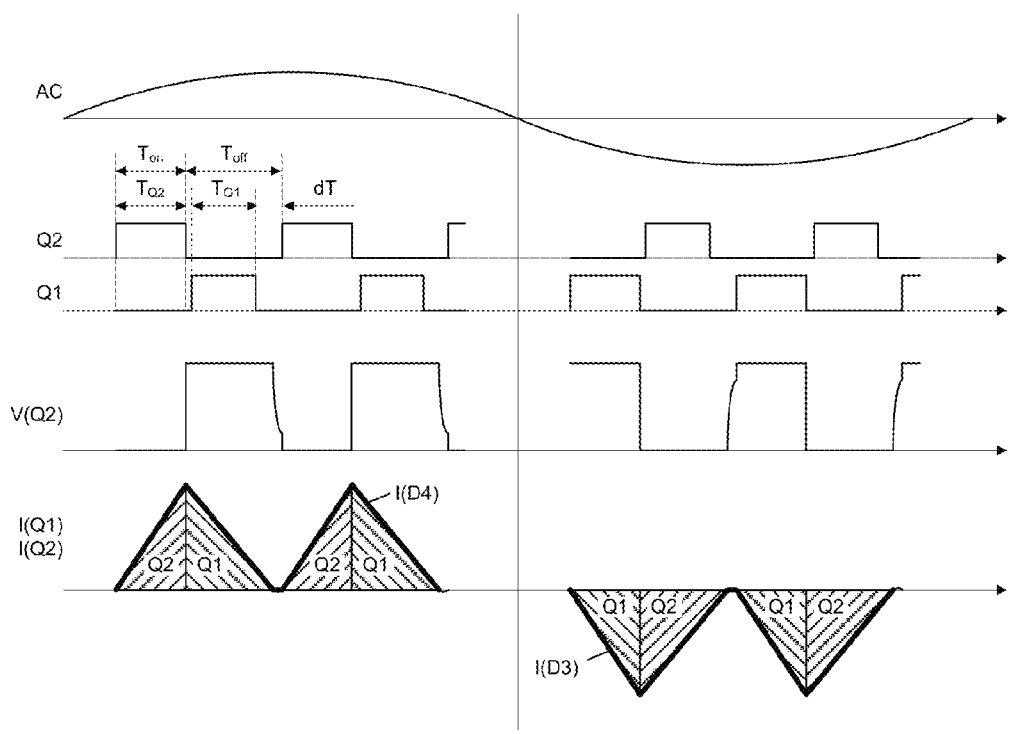
FIG. 10 is a graphical diagram showing voltage and current waveforms and timing associated with the input rectifier circuit of FIG. 9.

FIG. 10 illustrates one embodiment of a control method that can be used with the input rectifier circuit 23 of the present invention, as shown in FIG. 9. The input rectifier circuit 23 is run in a transition mode, meaning that the current in input inductor L1 for each new switching period starts substantially at 0 A, rises during a first time period $T_{on}$ to a peak current, and then decays during a second time period $T_{off}$ again to substantially 0 A. The first time period $T_{on}$ may be determined by a control circuit as a function of the required energy flow, and is substantially constant over one AC input half-period when using an inductor L1 having an inductance that does not substantially change in value with current bias. This will assure a near sinusoidal average input current.

In the positive half cycle of the AC input, switching element Q2 is switched on during the first time period $T_{on}$. During the negative half cycle of the AC input, switching element Q1 is switched on during the first time period $T_{on}$. During the second time period $T_{off}$ and the positive (or negative) half cycle of the AC input, switching element Q1 (or Q2) is switched on at the end of the first time period $T_{on}$ and is switched off during time period dT before the second time period $T_{off}$ ends to avoid reverse current through the switch.

The duration of the second time period $T_{off}$ can be estimated by logic in a control circuit using the following equation:

$$T_{off} = T_{on}\frac{V_{AC}}{V_{Bulk} + V_{AC}}$$

where $V_{AC}$ is the momentary AC input voltage and $V_{Bulk}$ is the momentary voltage across the bulk capacitor C1. The time period $T_{Q1}$ (for the positive AC input half-cycle) would in this case be determined by the control circuit as $$T_{Q1} = IF T_{off} - dT > T_{Q1min} \text{ THEN } T_{off} - dT \text{ ELSE } 0$$

The time period dT may be chosen such that uncertainties in the measurement of the AC input voltage $V_{AC}$, bulk voltage $V_{Bulk}$, and the inductance of input inductor L1 would still result in a time period $T_{Q1}$ during which the switch current I(Q1) or I(Q2) is not reversing. The time period dT may be in a range of 300 ns to 1 μs. Also, a minimum switch on time $T_{Q1min}$ may be defined to avoid a switch turn on for a very short time. In a typical application, the minimum switch on-time $T_{Q1min}$ may be chosen as a function of switch turn-on and turn-off delays, and as a balance between the additional drive losses compared to the lower conduction loss when the switch is on. A typical value for $T_{Q1min}$ may be in the range of 500 ns to 1 μs.

Figure 8:
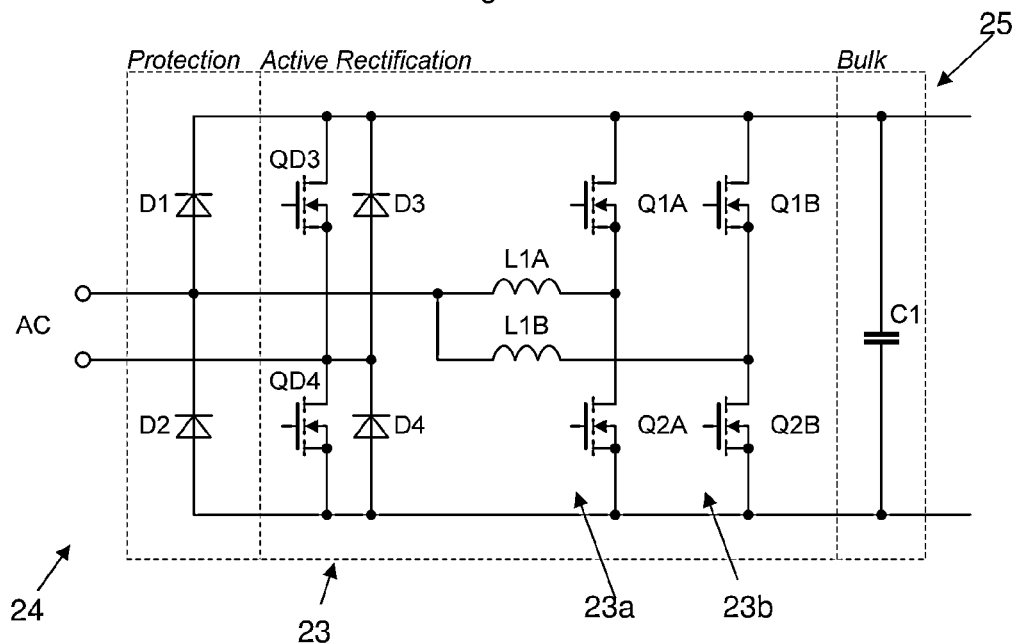
FIG. 8 is a schematic diagram of another embodiment of the input rectifier circuit of the present invention.

FIG. 8 shows another embodiment of an input rectifier circuit 23 in accordance with the present invention in which there are two interleaved current shaper circuits 23a and 23b operating in parallel. In this embodiment, the first current shaper circuit 23a includes first and second switch elements Q1A and Q2A coupled to a first input inductor L1A. The second current shaper circuit 23b includes first and second switch elements Q1B and Q2B coupled to a second input inductor MB. The operation of the interleaved embodiment of FIG. 8 proceeds as described with reference to FIGS. 9 and 10, with the half-bridge circuit formed by switch elements Q1B and Q2B operating 180° out of phase with respect to the half-bridge circuit formed by switch elements Q1A and Q2A. This arrangement can reduce high frequency ripple current in the AC input which can allow for the use of smaller filter components.

The embodiment of FIG. 8 can be used to further improve efficiency at light loads by switching off one of the current shaper circuits 23a or 23b. In another embodiment, the control circuit and method would operate only one current shaper circuit 23a when the AC input voltage (current) is low, for example when it is less than 50% of its peak value, and dynamically turn on the second current shaper circuit 23b in every AC voltage cycle when the AC voltage (current) is high, for example when it is greater than 50% of its peak value. Although FIG. 8 shows an implementation with two current shaper circuits, the concept of this alternative embodiment is not limited to two phases but can be expanded to n-phases. The function and operation of the circuit remain the same, with the exception that the switch elements would preferably be controlled such that the interleave is 360°/n.

FIG. 8 also shows another modification of the input rectifier circuit 23 that can increase overall circuit efficiency. In this alternative embodiment, active switches QD3 and QD4 may be connected in parallel with corresponding diodes D3 and D4 as shown. The switches QD3 and QD4 are controlled by the control circuit (not shown) synchronously with the AC input. During the positive half cycle of the AC input voltage, switch QD4 is enabled and switch QD3 is disabled. During the negative half cycle, switch QD3 is enabled and QD4 disabled. The controller is transitioning the switch states of QD3 and QD4 at the zero crossing of the AC line voltage such that the switches are never turned-on at the same time. In yet another embodiment, the diodes D3 and D4 are not used and are replaced by switches QD3 and QD4.

In some applications of the AC/DC converter of the present invention, it may be advantageous to employ additional bulk capacitor circuitry to harvest more stored charge from the bulk capacitor at a high voltage level. This can be accomplished, for example, by employing an additional boost circuit to increase the bulk voltage level across the bulk capacitor.

Thus, although there have been described particular embodiments of the present invention of a new and useful AC/DC Power Converter with Active Rectification and Input Current Shaping it is not intended that such references be construed as limitations upon the scope of this invention except as set forth in the following claims.

What is claimed is:

1. An AC/DC power converter comprising:
   an AC input having first and second terminals and a DC output having first and second terminals;
   an input rectifier circuit coupled to the AC input, the input rectifier circuit comprising
      a passive diode first half-bridge rectifier circuit comprising first and second diodes coupled to the second AC input terminal and functional to provide rectification of an AC input voltage signal,
      a first input current shaper circuit comprising first and second switches coupled in parallel with the first and second diodes and controlled synchronously with the AC input voltage signal, and a first input inductor coupled on a first end between the first AC input terminal and a switch node between the first and second switches in the first input current shaper circuit,
      a second input current shaper circuit comprising first and second switches coupled in parallel with the first and second switches of the first input shaper circuit and controlled to interleave in operation with respect to the first and second switches of the first input current shaper circuit, and a second input inductor coupled on a first end between the first AC input terminal and the first end of the first input inductor, and on a second end to a switch node between the first and second switches of the second input shaper circuit;
      the first and second input current shaper circuits are functional in combination to shape an AC input current signal associated with an AC input power signal to a substantially sinusoidal current signal;
   a bulk capacitor circuit coupled to the input rectifier circuit;
   a DC/AC converter circuit coupled to the bulk capacitor circuit;
   a resonant circuit comprising a resonant capacitor and a transformer having a primary side coupled to the DC/AC converter circuit and a secondary side having first and second ends and a center tap coupled to the first DC output terminal; and
   an output active rectifier switch circuit comprising a first output rectifier switch coupled on a first end to the first end of the secondary side of the transformer, and a second output rectifier switch coupled on a first end to the second end of the secondary side of the transformer, the second ends of the first and second output rectifier switches coupled to the second DC output terminal.

2. The AC/DC power converter of claim 1 wherein the input rectifier circuit further comprises a protection circuit coupled to the input current shaper circuit.

3. The AC/DC converter of claim wherein each of the first and second switch elements of the first input current shaper circuit comprises:
   a pair of first and second MOSFET switches, the first and second MOSFET switches each having an intrinsic diode and a source terminal, the source terminals connected in common;
   a fast recovery diode; and
   the pair of first and second MOSFET switches is parallel coupled with the fast recovery diode so that one of the intrinsic diodes is electrically coupled inversely to the fast recovery diode.

4. The AC/DC converter of claim 3 wherein the first MOSFET switch in each pair of MOSFET switches has a lower breakdown voltage than a breakdown voltage of the second MOSFET switch in the pair.

5. The AC/DC converter of claim 1, the resonant circuit comprising:
   a series inductor having a first end coupled to the DC/AC converter and a second end coupled to an inductor node;
   a parallel inductor having a first end and a second end, the first end coupled to the series inductor at the inductor node;
   the resonant capacitor circuit coupled to the second end of the parallel inductor; and
   the primary side of the transformer coupled across the parallel inductor.

6. The AC/DC converter of claim 1, the resonant circuit further comprising:
   a first resonant inductance realized by the magnetizing inductance associated with the transformer; and
   a second resonant inductance realized by the leakage inductance associated with the transformer.

7. The AC/DC converter of claim 5 wherein the resonant capacitor circuit is coupled across the bulk capacitor circuit and comprises a first resonant capacitor and a second resonant capacitor series connected together at the second end of the parallel inductor.

8. The AC/DC converter of claim 7 wherein the first and second resonant capacitors have a substantially equal capacitance.

9. The AC/DC converter of claim 1 wherein the bulk capacitor circuit comprises at least one electrolytic capacitor.

10. The AC/DC converter of claim 2 further comprising an input filter circuit coupled between the AC input and the protection circuit.

11. The AC/DC converter of claim 10 further comprising an output filter circuit coupled between the output rectifier circuit and the DC output.

12. The AC/DC converter of claim 7 further comprising first and second clamp diodes connected in parallel with the respective first and second resonant capacitors.

13. An AC/DC power converter comprising:
   an AC input having first and second terminals and a DC output having first and second terminals;
   an input rectifier circuit coupled to the AC input, the input rectifier circuit comprising
      a passive diode first half-bridge rectifier circuit comprising first and second diodes functional to provide rectification of an AC input power signal,
      a plurality of input current shaper circuits, each of said input current shaper circuits comprising first and second switches coupled in parallel with the first and second diodes, and an input inductor coupled on a first end between the first AC input terminal and a switch node between the first and second switches in the respective input current shaper circuit,
      the respective input current shaper circuits are interleaved to operate out of phase with each other input current shaper circuit and functional in combination to shape an AC input current signal associated with an AC input power signal to a substantially sinusoidal current signal;

a bulk capacitor circuit coupled to the input rectifier circuit;

a DC/AC converter circuit coupled to the bulk capacitor circuit;

a resonant circuit comprising a resonant capacitor and a transformer having a primary side coupled to the DC/AC converter circuit and a secondary side having first and second ends; and an output full-bridge active rectifier switch circuit comprising first and second output rectifier switches coupled in series across the first and second DC output terminals, the first end of the secondary side of the transformer coupled to a node between the first and second output rectifier switches, and third and fourth output rectifier switches coupled in series across the first and second DC output terminals, the second end of the secondary side of the transformer coupled to a node between the third and fourth output rectifier switches.

14. The AC/DC power converter of claim 13, wherein the input rectifier circuit further comprises a protection circuit coupled to the input current shaper circuits.

15. The AC/DC converter of claim 14, further comprising an input filter circuit coupled between the AC input and the protection circuit.

16. The AC/DC converter of claim 15 further comprising an output filter circuit coupled between the output rectifier circuit and the DC output.

17. The AC/DC converter of claim 13, wherein the first and second switches in each of the plurality of input current shaper circuits comprises:

a pair of first and second MOSFET switches, the first and second MOSFET switches each having an intrinsic diode and a source terminal, the source terminals connected in common;

a fast recovery diode; and the pair of first and second MOSFET switches is parallel coupled with the fast recovery diode so that one of the intrinsic diodes is electrically coupled inversely to the fast recovery diode.

18. The AC/DC converter of claim 17, wherein the first MOSFET switch in each pair of MOSFET switches has a lower breakdown voltage than a breakdown voltage of the second MOSFET switch in the pair.

19. The AC/DC converter of claim 13, the resonant circuit comprising a series inductor having a first end coupled to the DC/AC converter and a second end coupled to an inductor node;

a parallel inductor having a first end and a second end, the first end coupled to the series inductor at the inductor node;

the resonant capacitor circuit coupled to the second end of the parallel inductor; and the primary side of the transformer coupled across the parallel inductor.

20. The AC/DC converter of claim 19, wherein the resonant capacitor circuit is coupled across the bulk capacitor circuit and comprises a first resonant capacitor and a second resonant capacitor series connected together at the second end of the parallel inductor.

21. The AC/DC converter of claim 20 wherein the first and second resonant capacitors have a substantially equal capacitance.

22. The AC/DC converter of claim 20 further comprising first and second clamp diodes connected in parallel with the respective first and second resonant capacitors.

23. The AC/DC converter of claim 13, the resonant circuit further comprising:

a first resonant inductance realized by the magnetizing inductance associated with the transformer; and a second resonant inductance realized by the leakage inductance associated with the transformer.

24. The AC/DC converter of claim 13 wherein the bulk capacitor circuit comprises at least one electrolytic capacitor.

* * * * *